(12) United States Patent
Eibl

(10) Patent No.: US 12,323,017 B2
(45) Date of Patent: Jun. 3, 2025

(54) ROTOR AND ELECTRIC MACHINE

(71) Applicant: Bayerische Motoren Werke Aktiengesellschaft, Munich (DE)

(72) Inventor: Michael Eibl, Inning A. Holz (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 115 days.

(21) Appl. No.: 17/801,466

(22) PCT Filed: Mar. 4, 2021

(86) PCT No.: PCT/EP2021/055471
§ 371 (c)(1),
(2) Date: Aug. 22, 2022

(87) PCT Pub. No.: WO2021/197753
PCT Pub. Date: Oct. 7, 2021

(65) Prior Publication Data
US 2023/0117021 A1 Apr. 20, 2023

(30) Foreign Application Priority Data
Apr. 1, 2020 (DE) ...................... 10 2020 109 019.6

(51) Int. Cl.
*H02K 15/12* (2025.01)
*H02K 3/52* (2006.01)

(52) U.S. Cl.
CPC ............. *H02K 15/12* (2013.01); *H02K 3/527* (2013.01); *H02K 2203/09* (2013.01)

(58) Field of Classification Search
CPC ...... H02K 15/12; H02K 15/022; H02K 3/527; H02K 2203/12; H02K 2203/06; H02K 2203/09; H02K 13/02; H02K 1/24
See application file for complete search history.

(56) References Cited

U.S. PATENT DOCUMENTS 5,115,556 A    5/1992  Gavrilidis et al.
5,634,258 A *  6/1997  Onodera ................ H02K 15/12
                                                310/43
(Continued)

FOREIGN PATENT DOCUMENTS

CN         201444610 U    4/2010
DE    10 2013 223 051 A1  5/2015
(Continued)

OTHER PUBLICATIONS

WO-0184685-A1 machine translation, Mar. 7, 2024.*
(Continued)

*Primary Examiner* — Leda T Pham
(74) *Attorney, Agent, or Firm* — Crowell & Moring LLP

(57) ABSTRACT

A rotor, in particular for a current-excited synchronous machine, is at least partly embedded in a potting compound. The rotor is equipped with at least one conductor element, which forms a winding and is connected to a current collecting element, wherein potting compound is provided at least between the current collecting element and the winding, and a connection section of the conductor element, the connection section extending between the winding and the current collecting element, is shielded from the potting compound by a decoupling element arranged at the connection section.

11 Claims, 1 Drawing Sheet

(56) References Cited

U.S. PATENT DOCUMENTS

| | | | |
|---|---|---|---|
| 9,653,976 B2* | 5/2017 | Matsuhisa | H02K 15/12 |
| 2009/0236926 A1* | 9/2009 | Tokizawa | H02K 3/528 |
| | | | 29/598 |
| 2012/0223598 A1 | 9/2012 | Matsuhisa | |
| 2020/0067367 A1 | 2/2020 | Braun et al. | |
| 2021/0184530 A1 | 6/2021 | Burmeister et al. | |

FOREIGN PATENT DOCUMENTS

| | | | |
|---|---|---|---|
| DE | 10 2015 208 186 A1 | 11/2016 | |
| DE | 10 2016 205 813 A1 | 10/2017 | |
| DE | 10 2018 214 081 A1 | 2/2020 | |
| DE | 10 2018 214 111 A1 | 2/2020 | |
| EP | 3 113 335 A1 | 1/2017 | |
| WO | WO-0184685 A1 * | 11/2001 | B60R 16/0215 |

OTHER PUBLICATIONS

International Search Report (PCT/ISA/210) issued in PCT Application No. PCT/EP2021/055471 dated Jun. 1, 2021 with English translation (four (4) pages).

German-language Written Opinion (PCT/ISA/237) issued in PCT Application No. PCT/EP2021/055471 dated Jun. 1, 2021 (five (5) pages).

German-language Search Report issued in German Application No. 10 2020 109 019.6 dated Feb. 3, 2021 with partial English translation (10 pages).

* cited by examiner

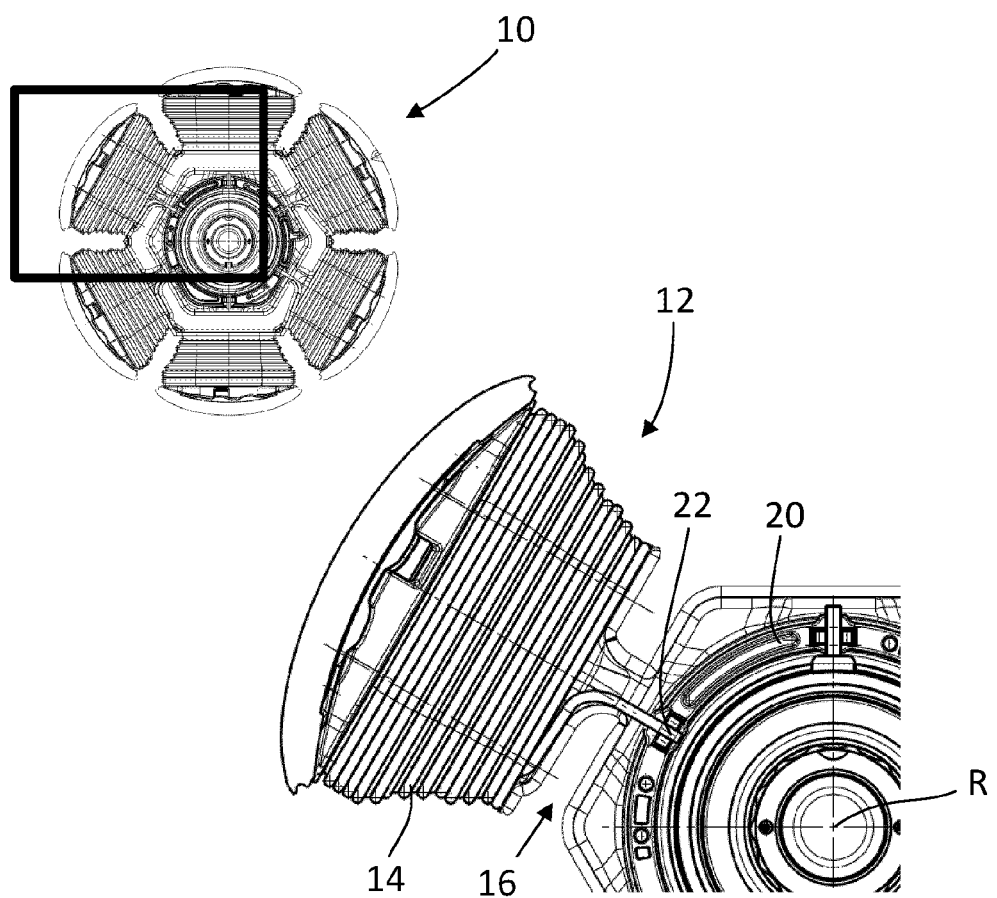

ROTOR AND ELECTRIC MACHINE

FIELD

The present invention relates to a rotor, in particular for a current-excited synchronous machine, and to an electric machine.

BACKGROUND AND SUMMARY

The mechanical stabilization of rotor windings is a major challenge, especially in the automotive sector, due to the high speed requirements that arise there in some cases. In this context, DE 10 2016 205 813 A1 proposes a method in which a rotor laminated core with wound rotor windings is placed in a mold, and wherein this arrangement is potted by injecting a plastics compound. When this compound cools, hairline cracks may occur, which lead to stresses in the potting. These cracks may increase during operation. Even irrespective of any prior damage, cracks may occur as a result of the high speeds occurring during operation. These cracks, which are not problematic in themselves, may be problematic for the conductors or wires from which the windings are formed. Particularly critical here are the conductor portions or wire portions that are not directly part of the winding or bear against the latter, rather those at the winding outlet, where the wire leaves the actual winding, for example to contact a current collecting element arranged on the rotor. In practice, it has been shown that the wires or conductors often break in these portions, wherein this damage is caused in particular by cracks in the potting compound.

It is therefore the object of the present invention to provide a rotor as well as an electric machine which eliminate the aforementioned disadvantages.

This object is achieved by a rotor and by an electric machine according to the present disclosure. Further advantages and features will become clear from the description and the accompanying FIGURE.

In accordance with the invention, a rotor, in particular a rotor for a current-excited synchronous machine, is at least partially embedded in potting compound, wherein at least one conductor element is arranged on the rotor and forms a winding and is connected to a current collecting element, wherein potting compound is provided at least between the current collecting element and the winding, and wherein a connection portion of the conductor element, the connection portion extending between the winding and the current collecting element, is shielded from the potting compound by a decoupling element arranged there. The current collecting element is a component which, according to an embodiment, is arranged on a rotor shaft of the rotor and on which the conductor elements/wires of the windings are brought together and connected. The current collecting element is electrically connected in a suitable manner to the slip rings of the rotor. According to a preferred embodiment, the rotor is joined from a plurality of laminations. These laminations, which are produced for example from electrical sheets, have slots or ribs extending along a rotor axis and arranged alternately in the circumferential direction. The windings are formed in the slots or around the ribs. For electrical contacting, a current collecting element or current collector is provided on the rotor and serves to provide electrical connection of the individual conductor elements, in particular the wires. The current collector is thus expediently arranged on a rotor shaft of the rotor, indirectly or directly. The conductor element is in particular a wire, preferably copper wire, wherein other materials are also conceivable and possible. In the region of the winding around the ribs, the copper wire is well protected by its fixed and compact arrangement. However, it is unprotected in the region where it leaves the winding itself and leads to the current collection element. In other words, it is exposed there, so to speak. If, for example, micromovements act on it in this connection portion, which may be indicated, for example, by a potting compound arranged there, in particular intensified by any microcracks that may be present there, the conductor element in the connection portion may crack. Advantageously, the decoupling element is now arranged or provided in this region, which enables the connection portion to be decoupled or shielded from the potting compound. In other words, the decoupling element prevents the potting compound from being touched, contacted or applied to the conductor element in the region of the connection portion. Any cracks present in the potting compound thus do not result in cracking of the conductor element in this region.

According to one embodiment, the decoupling element is arranged directly at the connection portion. In other words, the decoupling element is preferably arranged directly or immediately on the conductor element in the region of the connection portion. According to a preferred embodiment, the decoupling element is shaped or designed to completely or at least partially encase the conductor element in the region of the connection portion. The encasement can be provided by sliding on a decoupling element in tube or hose form or by wrapping with a suitable material in tape or strip form.

According to one embodiment, the decoupling element is a sheath element which is designed to completely encase the connection portion. According to a preferred embodiment, the sheath element is formed from a material that is flexible or yielding, at least in regions. Preferably, the sheath element is a completely closed sheath element which is arranged on the conductor element in a direction of longitudinal extent of the latter.

According to a preferred embodiment, a textile element, such as a woven or braided fabric, is used as the material for the sheath element. According to one embodiment, a glass fiber fabric or glass silk fabric is used as the material, particularly preferably comprising a silicone component. This advantageously prevents the potting compound from bonding with the material of the decoupling element/sheath element.

According to a preferred embodiment, the sheath element is a glass silk tube, particularly preferably a glass silk silicone tube, wherein the silicone component advantageously prevents the potting compound from bonding to the sheath element. Advantageously, the conductor element or the conductor elements of the winding are encased by a glass fiber tube in the region of the connection portions. This glass fiber tube acts advantageously as a barrier or block to any potting compound present in this region. It has been found that a wire breakage can thus be avoided extremely effectively.

According to an alternative embodiment, the decoupling element is formed by an elastic layer, wherein the connection portion or conductor element is preferably embedded in the elastic layer.

According to one embodiment, the elastic layer is formed by a silicone material. According to one embodiment, wherein the connection portion is embedded between the base layer and the top layer. According to an embodiment, the base layer is first applied to the rotor in the region of the connection portion. The conductor element is then arranged, followed by the arrangement or application of the top layer, so that the conductor element is advantageously completely encased by the elastic layer in the region of the connection portion.

According to an alternative embodiment, the conductor element in the connection portion is replaced by a contact element. According to one embodiment, the contact element is a suitably formed cable lug. The contact element is preferably an element which has a higher strength or stability than a conductor element made of wire.

According to a preferred embodiment, the rotor has multiple connection portions, wherein each of the connection portions is shielded by a decoupling element.

The invention is also directed to an electric machine comprising a rotor according to the invention. Preferably, the electric machine is a current-excited synchronous machine. According to a preferred embodiment, the electric machine is a traction motor of a partially or fully electrified motor vehicle, in particular a passenger car or a motorcycle.

The proposed decoupling elements can advantageously be assembled quickly. They can be fitted or assembled by hand or mechanically, for example by using suitable industrial robots.

Further advantages and features will become apparent from the following description of embodiments of a rotor or electric machine with reference to the accompanying FIGURE.

BRIEF DESCRIPTION OF THE DRAWING

FIG. 1 shows two views of a rotor seen along a rotor axis.

DETAILED DESCRIPTION

FIG. 1 shows, in the upper left half of the image, a rotor 10, seen along a rotor axis R. The rectangular frame indicates a detail which is shown enlarged in the lower right half of the image. In particular, a winding 12 can be seen here, which is formed by a conductor element 14. This conductor element 14 is connected via a connection portion 16 to a contact point 22 of a current collecting element 20. In the region between the contact point 22 and the exit of the conductor element 14 from the winding 12, referred to here as the connection portion 16, the conductor element 14 is substantially "free". In accordance with the invention, it is now precisely in this region that the arrangement of a decoupling element is provided. In accordance with one embodiment, for example, in the region of the connection portion 16 the conductor element 14 is encased by a suitable sheath element, such as a glass fiber tube, or is wrapped in a suitable manner. Alternatively, an elastic layer is provided or arranged in this region and is designed to protect the conductor element 14 in the region of the connection portion and, in particular, to envelope or encase it. Alternatively, the conductor element 14 is replaced in the region of the connection portion 16 by a contact element which is arranged, so to speak, between the exit of the conductor element 14 from the winding 12 and the contact point 22. It has been found that the use of the decoupling elements can effectively prevent wire breakage in this region.

LIST OF REFERENCE SIGNS 10 rotor
12 winding
14 conductor element
16 connection portion
20 current collecting element
22 contact point
R rotor axis

The invention claimed is:

1. A rotor for a current-excited synchronous machine, at least partially embedded in potting compound, comprising:
   a plurality of windings that extend outward from a center axis of the rotor; and
   a plurality of conductor elements, wherein individual ones of the conductor elements are arranged on the rotor and each form a winding of the plurality of windings and are each connected to a current collecting element,
   wherein the potting compound is provided at least between the current collecting element and each of the plurality of windings, and
   wherein connection portions of each of the plurality of conductor elements, each extending between each one of the plurality of windings and the current collecting element, is shielded from the potting compound by a decoupling element arranged at each of the connection portions.

2. The rotor according to claim 1, wherein each decoupling element is arranged directly at each connection portion.

3. The rotor according to claim 1, wherein each decoupling element is a sheath element that completely encases each connection portion.

4. The rotor according to claim 3, wherein the sheath element is a glass silk silicone tube.

5. The rotor according to claim 1, wherein each decoupling element comprises an elastic layer in which each connection portion is embedded.

6. The rotor according to claim 5, wherein the elastic layer is formed of silicone, wherein the elastic layer comprises a base layer and a top layer, and wherein the connection portion is embedded between the base layer and the top layer.

7. The rotor according to claim 1, further comprising:
   a contact element in each connection portion connecting each conductor element to the current collecting element.

8. An electric machine comprising the rotor according to claim 1.

9. The rotor according to claim 1, wherein each connection portion is shielded from the potting compound along an entire length of each of the connection portions by the decoupling elements, wherein each decoupling element completely encases each connection portion along its entire length.

10. The rotor according to claim 1, wherein each one of the plurality of windings has a respective winding axis that is substantially perpendicular to the center axis of the rotor.

11. The rotor according to claim 1, wherein potting compound is an injection molded structure that at least partially embeds the rotor therein.

* * * * *